United States Patent [19]

Finkenzeller et al.

[11] Patent Number: 4,464,779

[45] Date of Patent: Aug. 7, 1984

[54] X-RAY EXAMINATION DEVICE

[75] Inventors: Johann Finkenzeller, Erlangen; Wilfried Schmidt, Stein; Heinz Reinfelder, Wuerzburg, all of Fed. Rep. of Germany

[73] Assignee: Siemens Aktiengesellschaft, Berlin & Munich, Fed. Rep. of Germany

[21] Appl. No.: 420,897

[22] Filed: Sep. 21, 1982

[30] Foreign Application Priority Data

Sep. 30, 1981 [DE] Fed. Rep. of Germany ....... 3138911

[51] Int. Cl.³ .......................... A61B 6/00; G03B 41/16
[52] U.S. Cl. ........................................ 378/176; 378/91
[58] Field of Search ................... 378/150, 151, 176, 91

[56]         References Cited
         U.S. PATENT DOCUMENTS 3,383,506  5/1968  Bock et al. ........................ 378/176
3,502,878  3/1970  Stewart et al. .................... 378/151
3,862,426  1/1975  Thomas .
3,866,048  2/1975  Gieschen .

FOREIGN PATENT DOCUMENTS 1114085  9/1961  Fed. Rep. of Germany .
1127704  4/1962  Fed. Rep. of Germany .
 976870  7/1964  Fed. Rep. of Germany .
1522185  8/1969  Fed. Rep. of Germany .
2051033  4/1972  Fed. Rep. of Germany .
1231917  5/1971  United Kingdom .

Primary Examiner—Alfred E. Smith
Assistant Examiner—T. N. Grigsby
Attorney, Agent, or Firm—Hill, Van Santen, Steadman & Simpson

[57]          ABSTRACT

An exemplary embodiment comprises a spot film device, a transport mechanism for the transport of an image layer carrier from a ready position into an exposure position and back, and a speed control for the drive motor. A certain time interval which is essentially caused by the transport operations always lies between triggering an X-ray exposure and the actual exposure of the image layer. In order to facilitate release of the X-ray exposure at the proper point in time, the disclosure provides that the overall transport time of the image layer carrier from the ready position into the exposure position is kept constant independently of the mass to be transported. Additionally, the transport time can also be kept constant independently of the different length of the transport path given sequencing of a subdivision program. An inventive X-ray examination device is particularly suited for employment in X-ray diagnostics.

16 Claims, 7 Drawing Figures

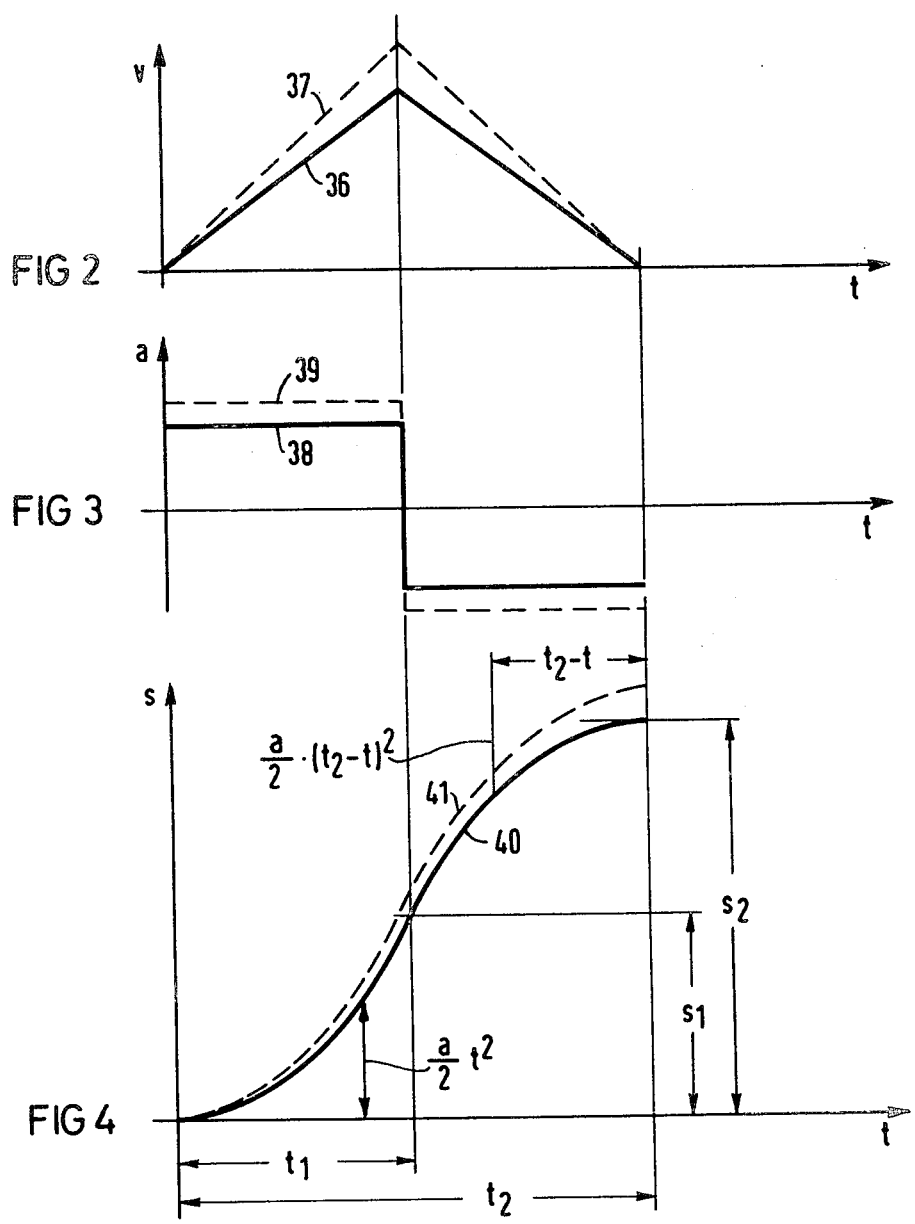

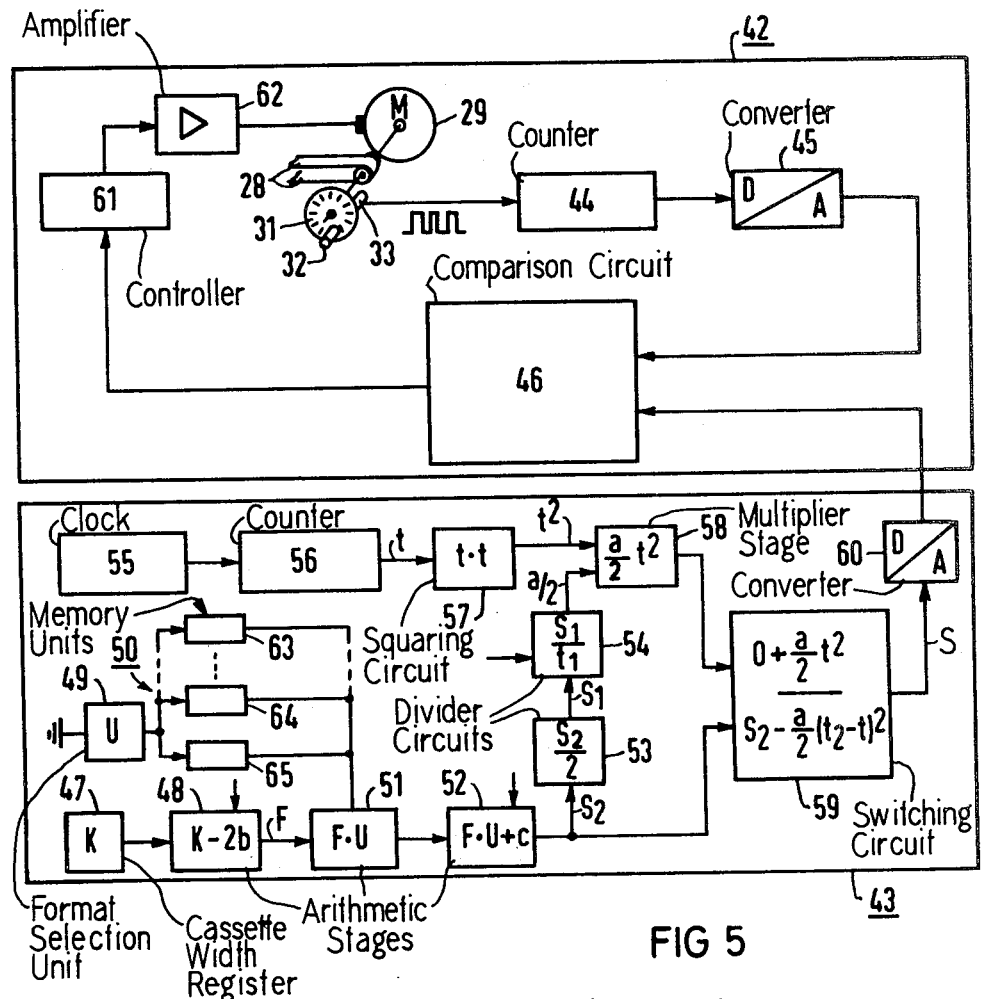
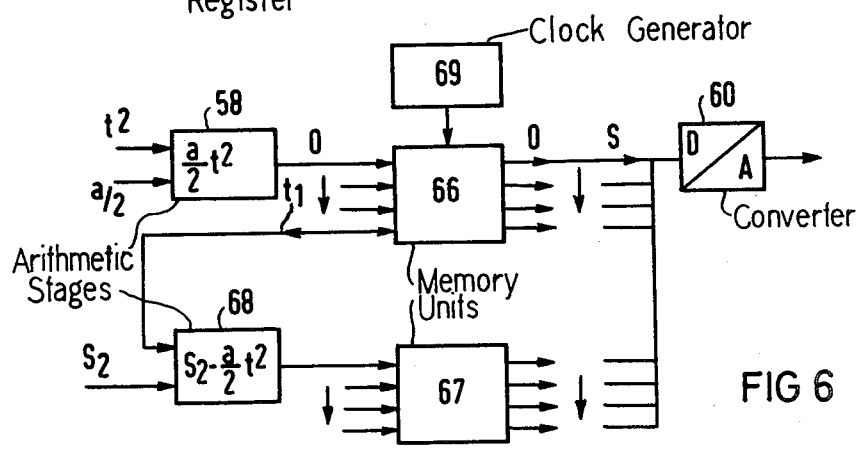
FIG 5
FIG 6

X-RAY EXAMINATION DEVICE

BACKGROUND OF THE INVENTION

The invention relates to an X-ray examination device having a spot film device, having transport means for the transport of an image layer carrier from a ready position into an exposure position and back, as well as having a speed control for the drive motor.

The spot film devices of X-ray examination devices allow an examination finding determined during fluoroscopy to be retained on a sheet of film. To this end, a sheet of film can be conveyed from a radiation-protected ready position into an exposure position of the spot film device centered relative to the X-ray cone and back. It is thereby of particular importance that the X-ray picture likewise be exposed within the shortest possible time interval after triggering. This is so important because many events in the body of the patient are subject to chronological change as a result of the inherent movement of the organs such as, for example, the lungs, the stomach or the heart, or as a result of the further transport of an injected contrast agent. On the other hand, the transport speed of the sheet of film from the ready position into the exposure position can also not be set too high because the X-ray examination device would otherwise be induced to vibrate given the acceleration and deceleration of the sheet of film or of an image plate and the appertaining film, or respectively, image layer carrier (film carriage, X-ray film cassette, cassette carriage, etc.), said vibrations leading to blurred exposures in the final analysis.

For the purpose of avoiding jolts during introduction of the cassette carriage into the exposure position, it is already known from German Pat. No. 976,870 and from the German AS No. 11 27 704 to allocate electrical and pneumatic anti-vibration elements to the carriage which reduce the acceleration forces, particularly upon entry into the exposure position, and therefore, allow higher accelerations of the image layer carrier or, respectively, of the X-ray film cassette.

In order to be able to shorten the chronological interval between triggering a picture and the exposure thereof even farther, it has been disclosed by the German OS No. 20 51 033 to control the speed of the drive motor for the cassette drive by means of a speed control and, despite high acceleration and deceleration, to thus achieve that the X-ray film cassette enters into the exposure position with a very low, control speed independently of its size and mass. By so doing, only slight deceleration forces occur in the time interval immediately before the exposure. Moreover, exact arresting of the X-ray film cassette in the exposure position is also possible because of the low in-bound speed. Nonetheless, the shortest possible time interval between triggering and exposing the picture attainable therewith is still considered too long. Pictures are exposed too late over and over again.

SUMMARY OF THE INVENTION

The object of the invention is to facilitate exposure of the X-ray picture for the physician at the proper point in time.

Given an X-ray examination device of the type initially cited, the overall transport time of the image layer carrier from the ready position into the exposure position is therefore kept constant given synoptic exposures, independently of the mass to be transported. This has the advantage that, in time, the physician gets a feeling as to the delay with which the X-ray picture is actually exposed after triggering. Particularly given moving subjects—we should like to particularly point out the peristalsis of the stomach, the movements of the lungs or the continuing flow of a contrast agent mix—the physician can thus estimate at what time interval the interesting position of the organ or, respectively, of the contrast agent will have been reached. By so doing, he is enabled to pre-trigger the X-ray exposure, offset by this time interval. In previous examination techniques, this time interval was of different lengths due to the different masses of the image layer carriers or, respectively, X-ray film cassettes of different sizes, so that no feeling for a lead time could develop. That led to the fact that desires were previously concentrated on shorter and shorter transition times which, fundamentally, can never be short enough.

A further improvement of the constancy of the lead time interval (which determines when the X-ray exposure must be triggered before the event to be recorded) can be achieved when, in a further development of the invention, the transport time is kept constant independently of the different lengths of the individual transport stretches when sequencing a film sub-division program. As a result, differences in the time interval between triggering the X-ray exposure and exposing the sheet of film which are caused by transport paths of different lengths during a sub-division program are avoided. The overall transport time can be shortened when, in a further development of the invention, the phases of acceleration and of retardation during one and the same respective transport operation are of practically equal lengths and are kept symmetrical relative to one another in terms of their course. This also includes that case in which the image layer carrier is accelerated during the entire first half of the path and is decelerated during the entire second half of the path. By so doing, the computational or, respectively, memory outlay for the control of the drive motor is reduced because of the symmetry. Thereby, the transport time to be observed for all paths derives from the shortest possible transport time which is to be observed given the longest possible transport path with the largest possible cassette without blurring the exposure.

In a particularly advantageous development of the invention, means can be allocated in the ready position for the defined positioning of the image layer carrier as well as measuring means for measuring the width of the image layer carrier in the transport direction, and means for measuring the respective transport path can be allocated to the drive motor, and said measuring means can be connected to a computer for identifying the overall path length to be traversed per film subdivision of the separately input subdivision program, for selecting a specific location/time profile given the prescribed transport time and the calculated transport path, and for the comparison of the transport path traversed in the time interval elapsed since triggering the exposure to the transport path calculated for this time interval as the rated value in the location/time profile. This allocation of the individual measuring means allows a design of a computer which guarantees the highest possible degree of control precision for this purpose with the lowest possible structural outlay.

A structure which is both simple and expedient derives when, in a further development of the invention, a perforated disc rotating in the light ray of at least one light source-photodetector arrangement, is coupled to the drive motor. Such a perforated disc disposed in the light path of a photodetector arrangement is both simple, reliable and allows a very precise determination of paths, particularly since it can be incorporated in the drive train for the image layer transport either before or after step-down gearing.

In a further development of the invention, a sensor for the edges of the image layer carrier which stops the entry of the image layer carrier can be disposed in the area of the ready position. This measure guarantees a precisely defined starting position for the transport of the image layer carrier from the ready position into the exposure position and is thus a precondition for a precise path prescription given entry into the respective exposure position.

In a further development of the invention, the pulses counted due to the interruption of the light path at the perforated disc while the image layer carrier travels past a photodetector can be counted as a measure for the width of the image layer carrier in the transport direction. Together with the fixed transport time and the selected film sub-division program, these pulse counts form the basis for caculating the location/time profile by the computer.

Further details of the invention are explained on the basis of a few exemplary embodiments illustrated in the Figures on the accompanying drawing sheets; and other objects, features and advantages will be apparent from this detailed disclosure and from the appended claims.

BRIEF DESCRIPTION OF THE DRAWING

FIG. 2 shows a diagram of the transport speed as a function of time;

FIG. 3 shows a diagram of the acceleration as a function of time during the transport operation;

FIG. 4 shows a diagram of the path traversed per time unit;

FIG. 5 is a diagrammatic illustration of an arrangement for controlling the motor speed;

FIG. 6 shows a circuit diagram of a different variation of the computer of FIG. 5 for generating the rated value schedule for traversal of the transport path.

DETAILED DESCRIPTION

Figure 1:
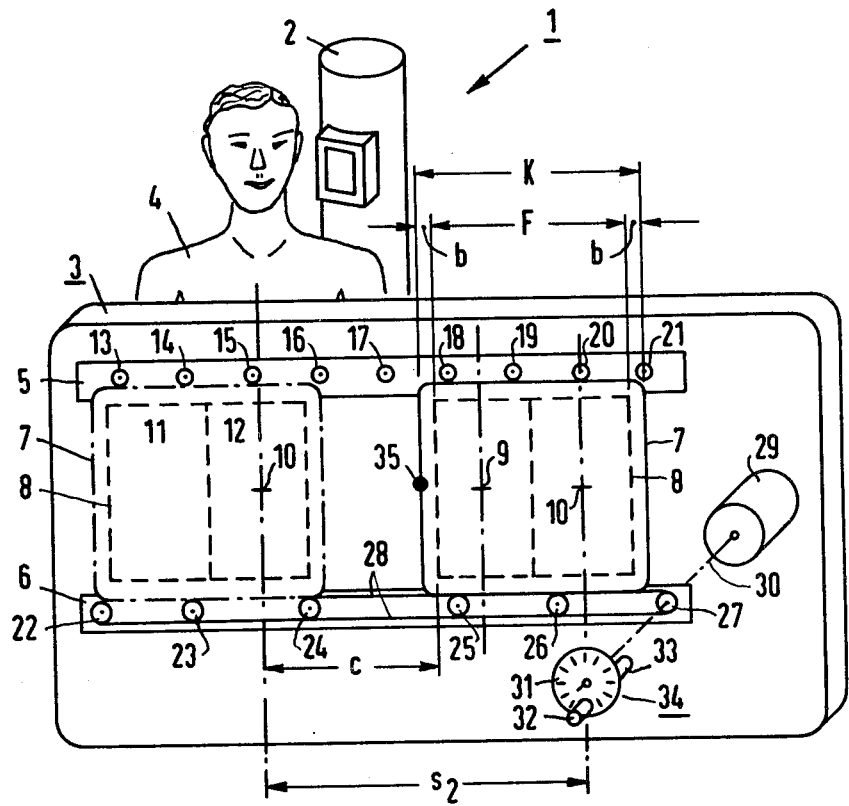
FIG. 1 shows a schematic illustration of the transport path of a cassette carriage in an X-ray spot film device.

In a schematic illustration, FIG. 1 shows an X-ray examination device 1 comprising an X-ray tube 2 and an X-ray spot film device 3. A patient 4 is indicated between the X-ray tube 2 and the spot film device 3. Two parallel transport rails 5, 6 are situated in the X-ray spot film device 3, an X-ray film cassette 7 being capable of transport between said rails from a ready position into the respective exposure position. The X-ray film cassette 7 situated in the ready position is illustrated with solid lines. The same X-ray film cassette 7 is shown in the exposure position with dot-dash lines in a position which it would assume during the second exposure given a two-fold sub-division of the film format. The sheet of film 8 situated in the X-ray film cassette 7 and the selected two-fold sub-division thereof are illustrated with broken lines. The center 9, 10 of the respective exposure field 11, 12 is marked reticule-like. In the exposure position, this center coincides with the gated central X-ray beam (not illustrated).

The upper and the lower transport rails 5, 6 carry free-wheeling rollers 13, 14, 15, 16, 17, 18, 19, 20, 21, 22, 23, 24, 25, 26, 27. A transport belt 28 stretched over two transport rollers 22, 27 is guided over said rollers on the lower transport rail 6. The X-ray film cassette 7 is loaded between said transport belt 28 and the respectively opposite transport rollers 13 through 21 of the upper transport rail 5. The right, outer transport roller 27 in the Figure is driven by a motor 29. A so-called perforated disc 31 provided with slots at its edge is situated on the shaft 30 of said motor. The perforated disc is disposed in such manner that its slots can be rotated passing between a light source 32 and a photodetector 33 aligned with the light source, to provide a light barrier arrangement 34. A further light barrier 35 is allocated to the ready position. It is disposed in such manner that an X-ray film cassette transported into the ready position interrupts its light beam.

In said FIG. 1, the width of the X-ray film cassette 7 in the transport direction is referenced with K and the width of the sheet of film 8 inserted in the X-ray film cassette is referenced with F. The distance between the outside edge of the X-ray film cassette and the inside edge of the X-ray film sheet is referenced with b. The dimension $S_2$ represents the transport path over which the X-ray film cassette must be transported from the ready position into the exposure position so that the respective center of the exposure field 11, 12 in the exposure position is aligned relative to the central beam.

In a diagram, FIG. 2 shows the desired chronological curve of the transport speed of the X-ray film cassette 7. This speed curve should be symmetrical and keep to a transport time of equal length for all transport paths from the ready position into the various exposure positions. The solid-line curve 36 therefore shows the speed diagram for a shorter transport path than does the broken line curve 37.

FIG. 3 shows the curve of the acceleration appertaining to FIG. 2. One can see therefrom that the X-ray film cassette 7 is constantly accelerated during the first half of the overall available transport time $t_2$ and is constantly retarded during the second half of said transport time. Further, one can see that the amounts of the acceleration and retardation are exactly identical to one another in magnitude given one and the same transport operation. The amount of acceleration, however, depends on the speed to be attained or, respectively, on the length of the transport path to be traversed and on the mass of the cassette. Here, too, the solid-line curve 38 is to be allocated to the shorter transport path and/or lower mass than is the broken-line curve 39.

In a path/time diagram, FIG. 4 shows the respectively traversed path segment for the two transport operations illustrated in FIGS. 2 and 3. Thereby, $t_2$ is the overall available, constant transport time and $t_1 = \frac{1}{2} \cdot t_2$ is that transport time available for the acceleration or, respectively, retardation. The ordinate value $S_2$ represents the overall transport path of the respective transport operation, i.e. the length of the respective sub-division step of the selected sub-division program. The overall transport path $S_2$ is of different lengths for the different sub-division steps. The length $S_1 = \frac{1}{2} \cdot S_2$ is that path segment available for the acceleration or, respectively, retardation. The transport segment traversed after the time t is referenced with $S = a/2 \cdot t^2$, this applying for $t \leq t_1$ when a represents the acceleration value. For $t \geq t_1$, one must extrapolate back from $t_2$, so that $S = a/2 \cdot (t_2-t)^2$ then applies. Here, too, the solid-line curve 40 corresponds to a smaller transport path than the broken-line curve 41.

In a schematic illustration, FIG. 5 shows an arrangement for controlling the motor speed. This essentially consists of a control loop 42 for controlling the motor 29 and a computer 43 connected to the control loop for prescribing the rated value schedule for the control loop. When the motor 29 is switched on, it is not only the transport belt 28 which is driven and which, as shown in FIG. 1, conveys the X-ray film cassette 7 from the ready position into the exposure position, but also the perforated disc 31 is co-rotated at the same time. This interrupts the illumination of the photodetector 33 and produces pulses at its output which are counted in a connected counter 44. The pulses so counted are a measure for the actually traversed transport segment (actual value). This count value from counter 44 is converted into an analog value by a digital-to-analog converter 45 and is then supplied to one input of a rated value/actual value comparison element 46.

Independently thereof, the pulses counted upon introduction of the X-ray film cassette 7 into the ready position while the photodetector (corresponding to photodetector 33) of the light barrier 35 disposed directly in front of the ready position in the transport direction is covered by the X-ray film cassette have been stored before the first X-ray exposure. The numerical value K thus obtained—which value K corresponds to the width of the inserted X-ray film cassette 7—is applied to the register 47 (FIG. 5). In a following arithmetic stage 48, the pre-known, constant value $2b$ which corresponds to the difference between widths of the X-ray film cassette and the inserted film sheet 8 is subtracted from the value K. The value F thus obtained corresponds to the width of the inserted sheet of film 8. Given the following selection of the film sub-division program at the format selection unit 49, the factors U corresponding to the individual sub-division steps of the selected sub-division program are successively applied to the second input of a multiplication stage 51 via a step-by-step switching unit 50 which program executes at every exposure release. Given a two-fold sub-division, the values of U amount to $\frac{1}{4}$ in the first sub-division step and amount to $\frac{3}{4}$ in the second sub-division step. Given a three-fold sub-division, they amount to 1/6, 3/6 and 5/6, etc. In a further arithmetic stage 52, the constant value c which corresponds to the distance from the center of the exposure position to the edge of the sheet of film is added to the product F·U. Depending, given a selected two-fold sub-division, upon whether $U=\frac{1}{4}$ was employed for the first sub-step or $U=\frac{3}{4}$ was employed for the second sub-step, the obtained amount $S_2$ (FIG. 5) corresponds to the transport path from the ready position into the first or, respectively, second exposure position. This value is divided in half in a further arithmetic stage 53. The value $S_1$ (FIG. 5) obtained in that manner corresponds to the path segment during which acceleration or, respectively, retardation must be carried out. In the arithmetic stage 54 following thereupon, the path $S_1$ (FIG. 5) is divided by a prescribed, constant value $t_1$ where $t_1$ corresponds to half of the fixed transport time $t_2$. The result $a/2$ corresponds to half the value of the acceleration a required for this purpose.

The computer 43 also contains a time clock generator 55 which can be placed in operation synchronously with the motor 29. Its pulses are counted by a connected counter 56. The value t available at the output of the counter 56 corresponds to the time elapsed since the time clock generator 55 and the motor 29 were placed in operation. The output of the counter 56 is supplied to a squaring stage 57. Its output value $t^2$ is supplied to the input of an arithmetic stage 58 which multiplies this value with the value $a/2$ supplied to the other input. The result $a/2 \cdot t^2$ corresponds to the rated value S traversed at the point in time t. This rated value is supplied to a digital-to-analog converter 60 via a switching stage 59 yet to be discussed. Said digital-to-analog converter 60 is connected to the other input of the rated/actual value comparison element 46 of the control loop 42. The rated/actual value comparison element 46 controls a controlling means 61 which directly influences the motor current via an amplifier 62.

As soon as half the time $t_2$ available for the transport operation has elapsed, i.e. as soon as $t=t_1=\frac{1}{2} \cdot t_2$, the switching stage 59 switches and forms the value $S_2 - a/2 \cdot (t_2-t_1)^2 = S$. Thus, a calculation back from $S_2$, i.e. from the exposure position or target position is carried out and the retardation is inserted as negative acceleration.

After entry into the respective exposure position and after releasing the X-ray exposure, a return is undertaken into the ready position according to the same pattern, whereby it is only the sense of rotation of the motor 29 which is reversed and the final standstill of the motor is not undertaken until the light barrier 35 allocated to the ready position has been passed, being undertaken in a manner not illustrated in greater detail. However, the light barrier 35 not only switches the motor 29 off but, rather, also forwards the step-by-step switching unit 50 for the sub-division program forward by one step, so that, given two-fold sub-division, the value $U=\frac{3}{4}$ is now supplied to the multiplication stage 51 for the next X-ray exposure instead of the value $U=\frac{1}{4}$.

The constant values $2b$, c, $t_1$ as well as the numerical values of the individual steps of the selectable film sub-division program can be permanently stored in the computer at the memory locations such as 63, 64, 65. Consequently, after insertion of the X-ray film cassette 7—i.e., as soon as the pulses of the photodetector 33 corresponding to the cassette width K have been counted and stored at register 47, FIG. 5, and the film format division has been selected by means of the format selector unit 49, FIG. 5, so as to activate the correct sub-division values at 63, 64, 65—the control of the motor speed can sequence in the above manner upon releasing of the exposure and after switching the time clock generator 55 and the motor 29 on in conjunction therewith.

In a different, modified embodiment of the computer as illustrated in FIG. 6, the path rated values S for the successive individual time intervals are calculated in the same manner as was explained on the basis of FIG. 5. Departing from the exemplary embodiment of FIG. 5, however, these path rated values S which were calculated for each individual clock step of the time clock generator 55 are stored in a memory 66 allocated to the acceleration phase and in second memory 67 allocated to the retardation phase. To that end, the arithmetic stage 58 (FIG. 5) is connected to the input of the first memory 66 with the value $a/2 \cdot t^2$. The arithmetic stage 68 is connected to the input of the second memory 67 following said first memory 66 with the value $S_2 - a/2 \cdot t^2$. A time clock generator 69 is allocated to the two memories. When releasing the X-ray exposure, then, the time clock generator 69 is switched on together with the drive motor 29, said time clock generator then calling in the individual path rated values S from the memories 66 and 67 in the prescribed time intervals. These path rated values are then supplied to the rated/actual value comparison element 46 of the control loop 42 via the digital-to-analog converter 60 in the same manner as described in FIG. 5.

Figure 7:
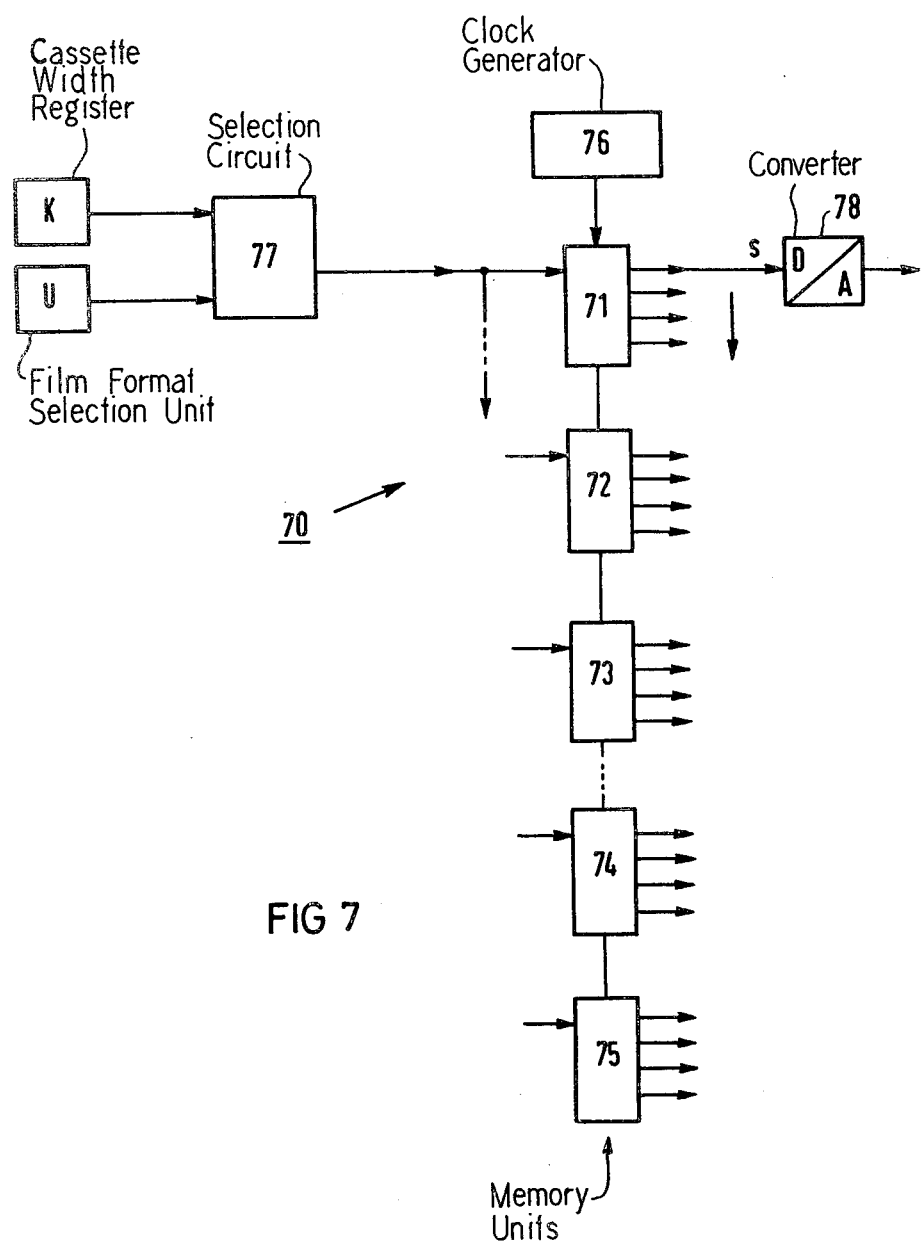
FIG. 7 shows a further circuit for generating the rated value schedule for the traversal of the transport path.

FIG. 7 shows a further, modified embodiment of the invention. For the purpose of prescribing the rated value, a memory arrangement 70 is here allocated to the control loop 42 for controlling the motor 29 illustrated in FIG. 5. All memories 71, 72, 73, 74, 75 of said memory arrangement 70 are connected to a common time clock generator 76. The rated path standards externally calculated per clock step are stored in the individual memories for every admissible cassette format and for every sub-divison program U selectable given the respective cassette format.

In the sensing of the cassette dimensions, as was explained on the basis of the exemplary embodiment of FIGS. 1 and 5, the value K and, upon selection of the sub-division program, the corresponding value U are input to the two inputs of a selection device 77. Said selection device activates the one of the memories 71, 72, 73, 74, 75 of the memory arrangement 70 corresponding to this cassette width and to this sub-division program. Upon release of the exposure and the switching-on of the motor 29 and of the clock generator 76 connected therewith, the individual path rated value standards stored in the selected memory are now successively called in at the rate of the time clock generator 76 and are forwarded over the following digital-to-analog converter 78 to the rated/actual value comparison element 46 of the control loop 42, FIG. 5. The further control sequence then again corresponds to that which was described on the basis of FIG. 5.

It will be apparent that many modifications and variations may be made without departing from the scope of the teachings and concepts of the present invention.

We claim as our invention:

1. An X-ray examination device comprising an image recording device for recording synoptic X-ray exposures on an image layer, transport means comprising a drive motor for the transport of an image layer carrier from a ready position into an exposure position and back, and speed control means for the drive motor, characterized in that said speed control means provides an overall transport time of the image layer carrier (7) from the ready position into the exposure position which is kept constant independently of the mass to be transported.

2. An X-ray examination device according to claim 1, characterized in that the transport time is kept constant independently of differences in the length of the transport path (s2) when sequencing a sub-division program.

3. An X-ray examination device according to claim 1, characterized in that the phases of acceleration and of retardation during respectively one and the same transport operation are kept of practically equal length and are kept symmetrical relative to one another in their course.

4. An X-ray examination device according to claim 1, characterized in that means (35) for the defined positioning of the image layer carrier (7) and measuring means (31, 32, 33, 34) for measuring the width of the image layer carrier in the transport direction are allocated to the ready position, and measuring means (31, 32, 33, 34) for measuring the respective transport paths are allocated to the drive motor (29), and said measuring means being connected to a computer (43) for identifying the overall transport path ($s_2$) to be traversed per sub-division step of the separately input sub-division program, for selecting a location/time profile and for supplying a rated value signal as a function of time, given the prescribed transport time and the identified transport path, and for comparing the transport path traversed in the time interval elapsed since releasing the exposure to the transport path calculated as the rated value signal according to the location/time profile for this time interval.

5. An X-ray examination device according to claim 1, characterized in that said measuring means comprises light barrier means (34) including a perforated disc (31) rotating in the light beam of the light barrier means (34) and coupled to the drive motor (29).

6. An X-ray examination device according to claim 1, characterized in that said measuring means comprises a sensor (35) for the edges of the image layer carrier (7) for stopping the entry of the image layer carrier, said sensor (35) being disposed in the area of the ready position.

7. An X-ray examination device according to claim 5, characterized in that said measuring means has a counter for counting pulses produced during the interruption of the light path at the perforated disc (31) when the image layer carrier (7) travels in the ready position to provide a measure for the width of the image layer carrier (7) in the transport direction.

8. An X-ray examination device according to claim 6, characterized in that said sensor (35) is aligned with a light beam path which crosses the inbound path of the image layer carrier (7) next to the ready position.

9. An X-ray examination device according to claim 8, characterized in that the sensor (35) switches the drive motor off after the image layer carrier has passed.

10. An X-ray examination device according to claim 4, characterized in that said speed control means comprises a computer (43) for calculating a number of measuring pulses corresponding to the transport path from the ready position into the exposure position on the basis of a pulse count of measuring pulses representing the width of the image layer carrier (7) and on the basis of the input sub-division program.

11. An X-ray examination device according to claim 10, characterized in that the computer (43) calculates the acceleration and the retardation symmetrical to said acceleration, based on the calculated transport path and on the fixed transport time.

12. An X-ray examination device according to claim 10, characterized in that, at prescribed time intervals, the speed control means compares a measuring pulse count to be expected according to the location/time profile to a measuring pulse count summed up beginning with the release of the exposure in accord with the traversed transport path, said speed control means further comprising a controlling means (61) for controlling the motor current or, respectively, the motor load in accordance with the polarity and value of the operational sign resulting from the comparison.

13. An X-ray examination device according to claim 12, characterized in that the summed-up measuring pulse count corresponding to the actually traversed path is interrogated at fixed time intervals after the beginning of the release of the exposure.

14. An X-ray examination device according to claim 4, characterized in that said speed control means comprises memory means (66, 67; 71, 72, 73, 74, 75), the values of the location/time profile determined for discrete image layer formats and sub-division steps being permanently deposited in said memory means (66, 67; 71, 72, 73, 74, 75) and being interrogated at prescribed time intervals to supply the rated value signal pertaining to such time interval.

15. An X-ray examination device according to claim 4, characterized in that said speed control means comprises computer means connected with said measuring means for calculating the values of the location/time profile upon insertion of the image layer carrier and the selection of the sub-division program.

16. An X-ray examination device according to claim 1, characterized in that said speed control means provides a transport time for the largest possible image layer carrier which is as short as possible.

* * * * *